(12) United States Patent
Gengintani et al.

(10) Patent No.: US 7,092,034 B2
(45) Date of Patent: Aug. 15, 2006

(54) VIDEO SIGNAL PROCESSING DEVICE AND METHOD, RECORDING MEDIUM, AND PROGRAM

(75) Inventors: Yukinori Gengintani, Tokyo (JP); Hisafumi Motoe, Saitama (JP)

(73) Assignee: Sony Corporation, Tokyo (JP)

( * ) Notice: Subject to any disclaimer, the term of this patent is extended or adjusted under 35 U.S.C. 154(b) by 452 days.

(21) Appl. No.: 10/482,675

(22) PCT Filed: Apr. 28, 2003

(86) PCT No.: PCT/JP03/05488

§ 371 (c)(1),
(2), (4) Date: Dec. 31, 2003

(87) PCT Pub. No.: WO03/094507

PCT Pub. Date: Nov. 13, 2003

(65) Prior Publication Data

US 2004/0196407 A1    Oct. 7, 2004

(30) Foreign Application Priority Data

May 2, 2002    (JP) .............................. 2002-130583

(51) Int. Cl.
*H04N 5/46* (2006.01)
(52) U.S. Cl. ...................................... 348/558; 348/620
(58) Field of Classification Search ................ 348/526, 348/558, 553–557, 449, 607, 618, 619; 345/698, 345/699; H04N 5/46
See application file for complete search history.

(56) References Cited

U.S. PATENT DOCUMENTS 4,837,626 A * 6/1989 Nishiyama et al. ......... 348/554
5,469,220 A    11/1995 Kumada
5,489,945 A * 2/1996 Kannegundla et al. ...... 348/521
5,999,222 A * 12/1999 Xie ............................ 348/525
6,154,257 A * 11/2000 Honda et al. ............... 348/558
6,366,327 B1    4/2002 Renner et al.

(Continued)

FOREIGN PATENT DOCUMENTS

EP    0 685 968    12/1995

(Continued)

OTHER PUBLICATIONS

Patent Abstracts of Japan, vol. 2000, No. 21, Aug. 3, 2001 & JP 2001 103341 A (Sony Corp), Apr. 13, 2001.

(Continued)

*Primary Examiner*—Michael H. Lee
(74) *Attorney, Agent, or Firm*—Frommer Lawrence Haug LLP; William S. Frommer

(57) ABSTRACT

The present invention is related to a video signal processing apparatus and method, a recording medium, and a program which are suitably for use in determining whether an input video signal is standard or nonstandard. In synchronization with the edge of an advance vertical sync signal xAVD, a free-running vertical sync edge counter 31 increments by 1 the count value which cycles between 0 through 7 and outputs the count value to a free-running field ID edge counter 32 and a comparator 33. In synchronization with the rising and falling edges of a field ID signal AFD, the free-running field ID edge counter 32 increments the count value by 1. The comparator 33 generates a nonstandard signal detection signal in correspondence with the FD edge count value with the V count value being 7 and a vertical sync signal xVD being at L level. The present invention is applicable to TV receivers for example.

11 Claims, 7 Drawing Sheets

U.S. PATENT DOCUMENTS 6,384,867 B1 * 5/2002 Seino et al. ................ 348/558

FOREIGN PATENT DOCUMENTS

| EP | 1 047 272 | 10/2000 |
|---|---|---|
| JP | 10-271361 | 10/1998 |
| JP | 2001-54070 | 2/2001 |
| JP | 2001-285808 | 10/2001 |

OTHER PUBLICATIONS

Patent Abstracts of Japan, vol. 013, No. 383 (E-811), Aug. 24, 1989 & JP 01 133486 A (Sanyo Electric Co Ltd), May 25, 1989.

* cited by examiner

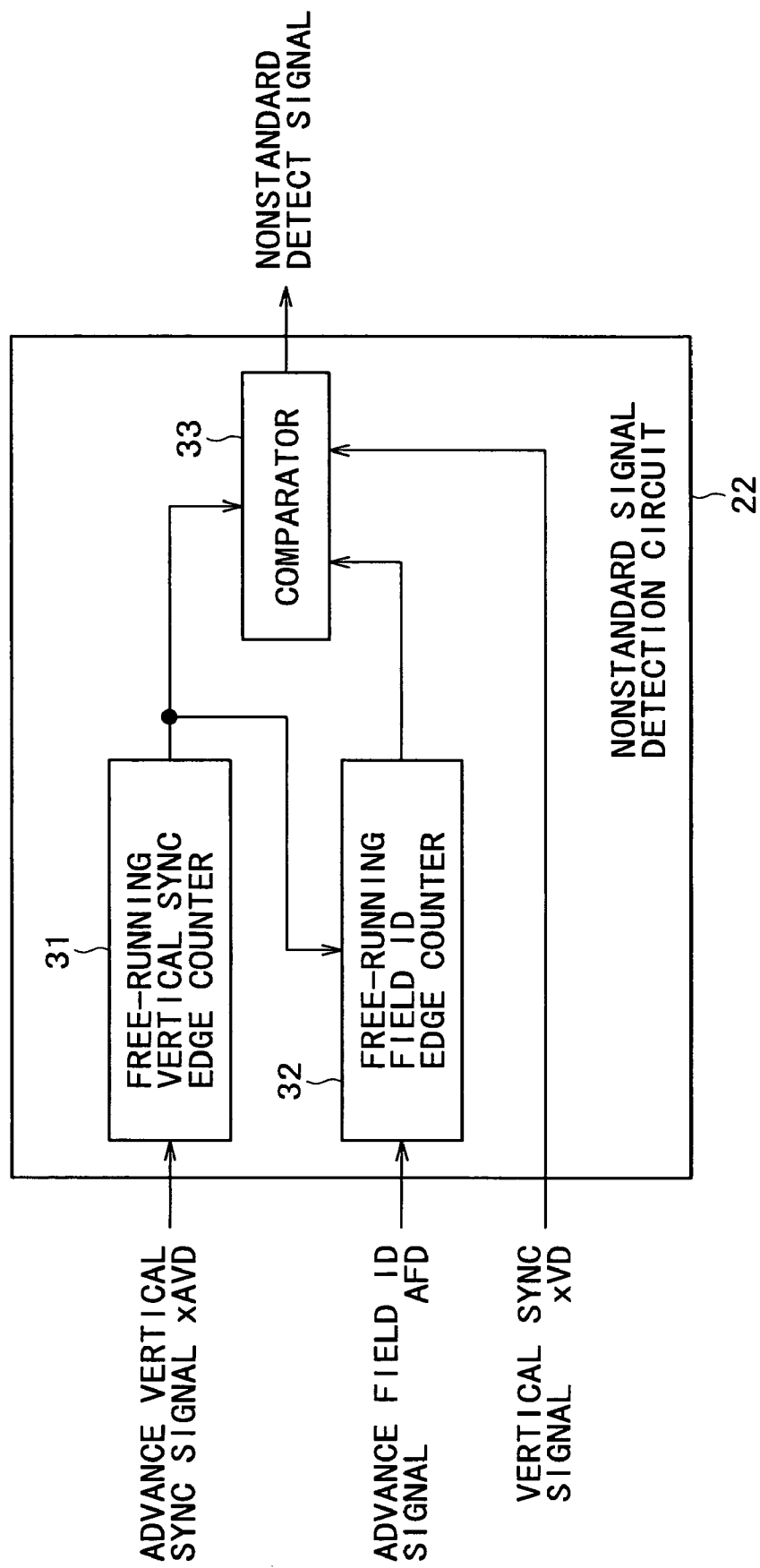

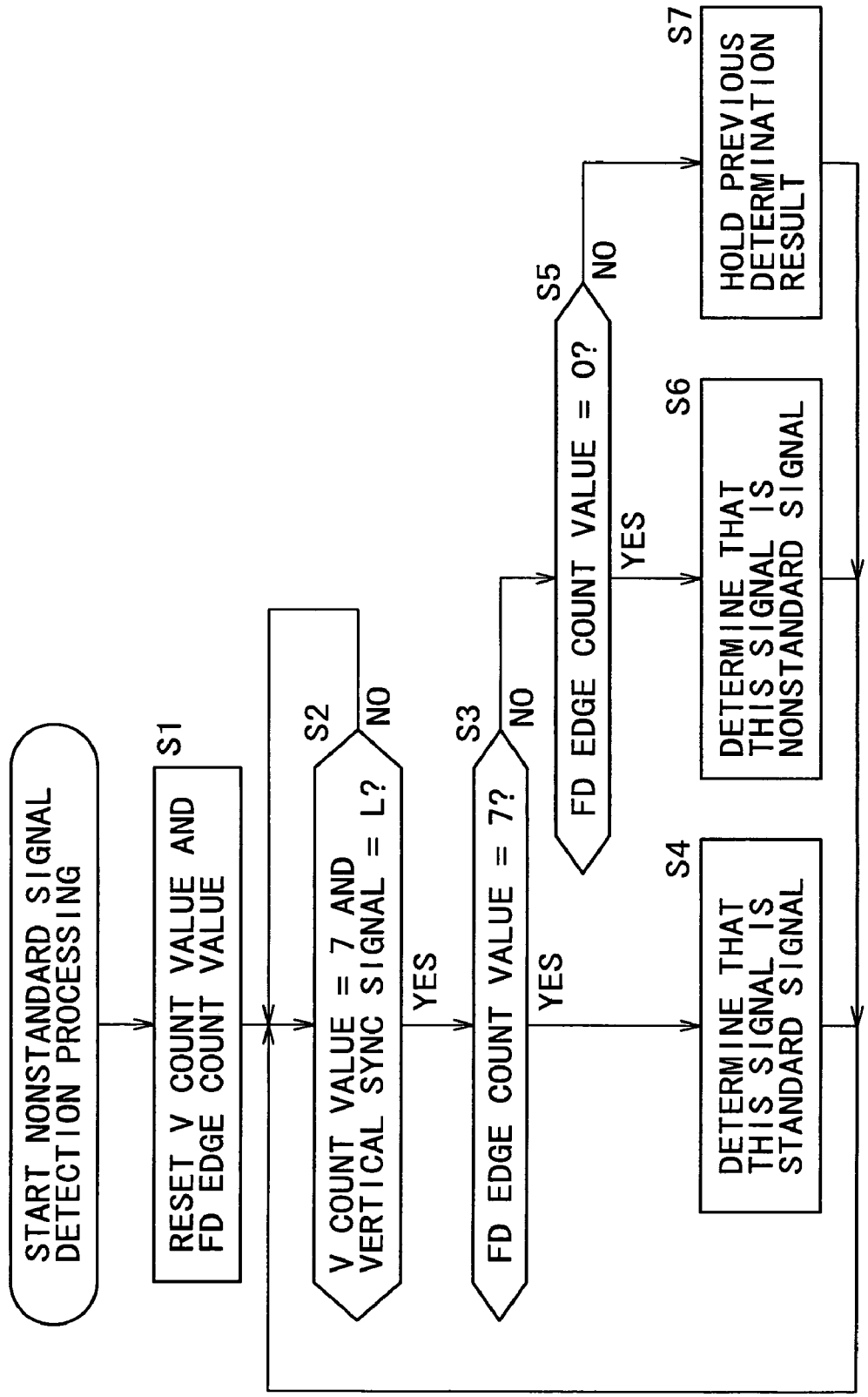

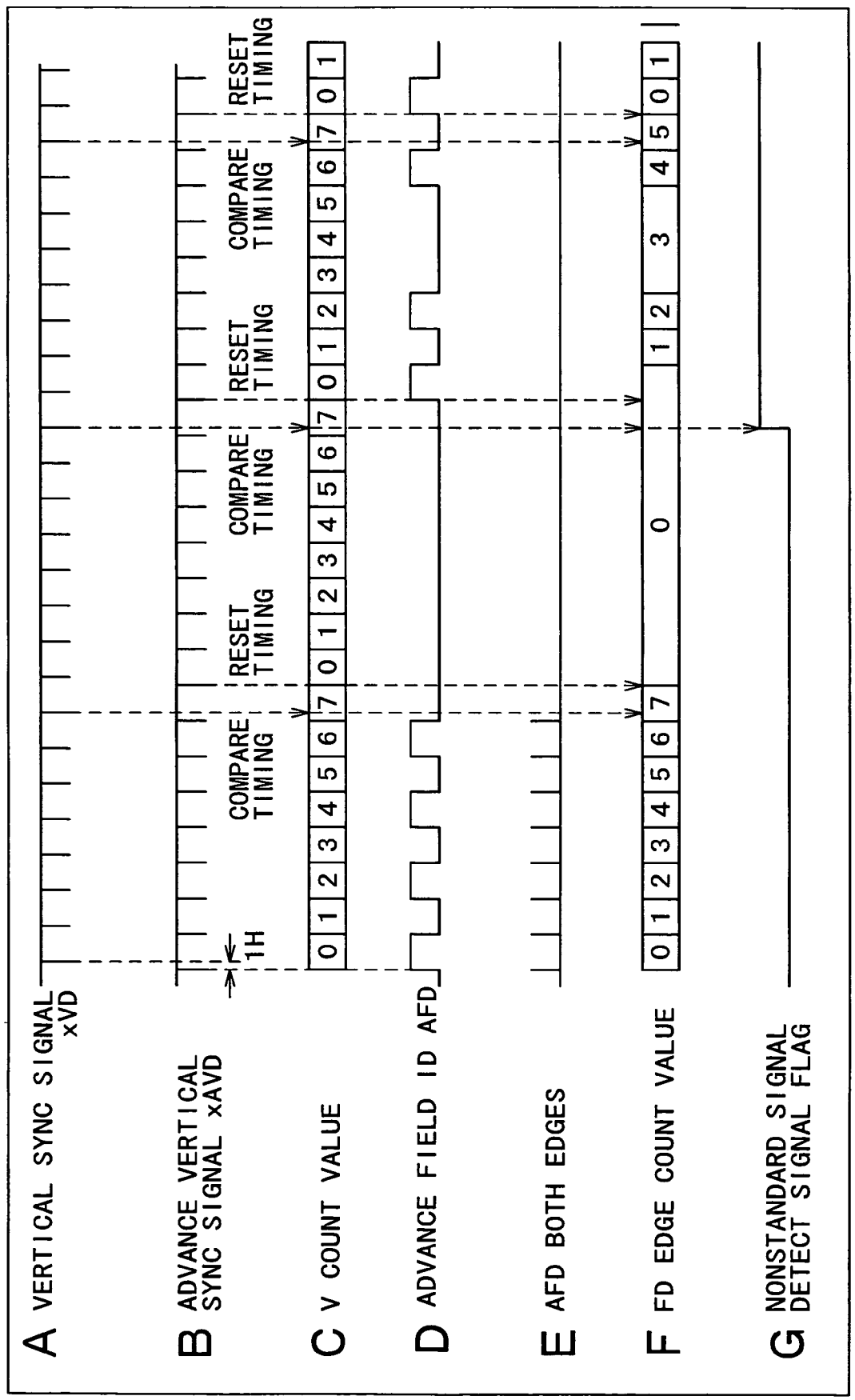

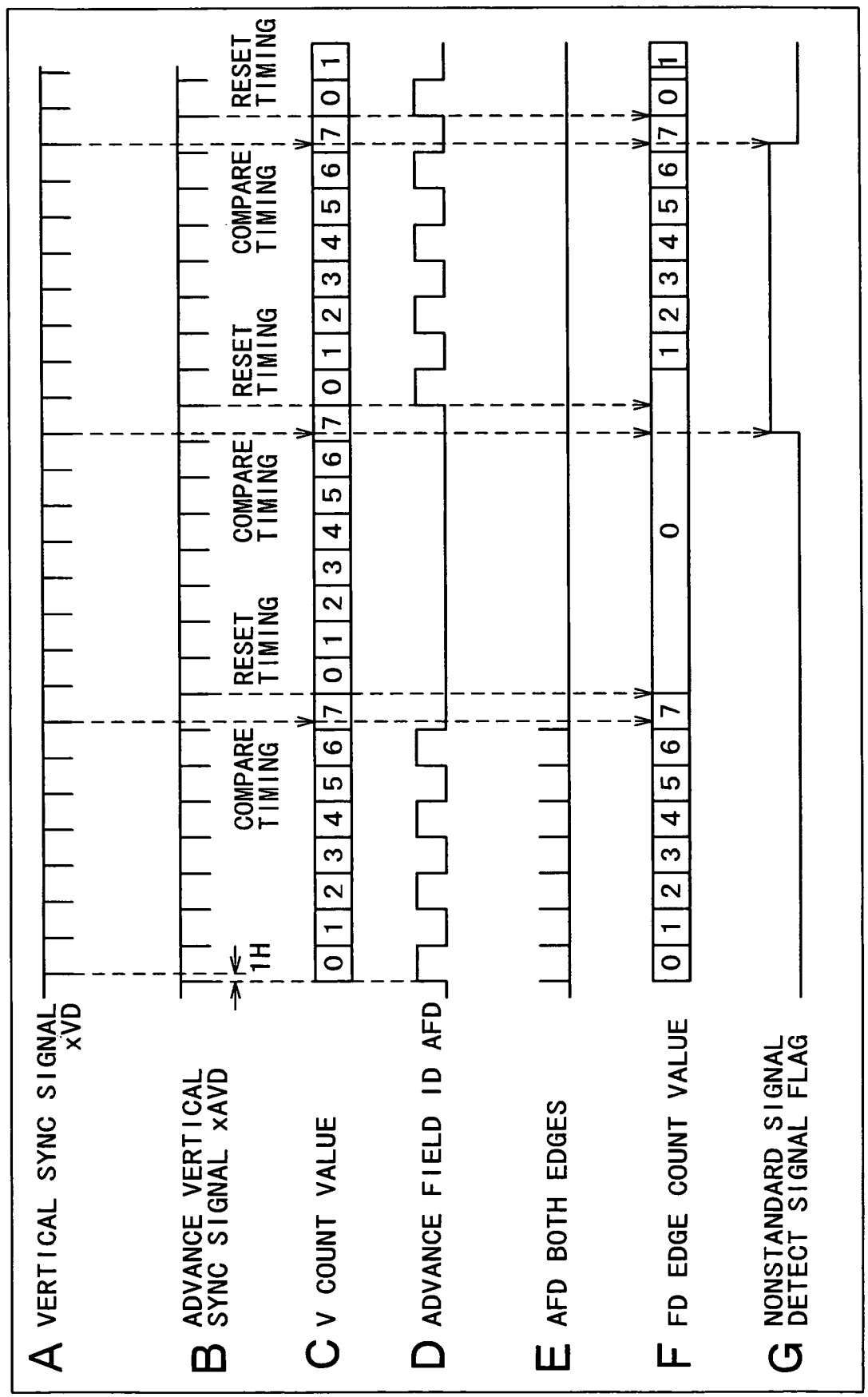

VIDEO SIGNAL PROCESSING DEVICE AND METHOD, RECORDING MEDIUM, AND PROGRAM

TECHNICAL FIELD

The present invention relates generally to a video signal processing apparatus and method, a recording medium, and a program and, for example, related to a video signal processing apparatus and method, a recording medium, and a program which are suitably for use in discriminating whether each input video signal is standard or nonstandard.

BACKGROUND ART

For noise reduction circuits for reducing noise in digital signals, so-called recursive noise reduction circuits are known in which a memory is used. Especially, these recursive noise reduction circuits are widely used when performing noise reduction on digital video signals.

General conventional recursive noise reduction circuits process the interlace video signals each configured by even-numbered field images and odd-numbered field images typified by NTSC and PAL schemes.

For example, the analog VCR (Video Cassette Recorder) is capable of not only providing normal speed playback but also providing irregular playback operations such as fast-forward, rewind, and picture search.

In the case of interlace video signals, a signal which is reproduced at the normal speed has a shift by 0.5 line between the horizontal sync pulses of the video signals of the even-numbered field and the odd-numbered field with reference to the vertical sync pulse. Such a signal is hereafter referred to as a standard signal.

On the other hand, in a video signal which is reproduced by an irregular playback operation such as fast-forward, the horizontal sync pulses of the video signals of the even-numbered field and the odd-number field are in phase with reference to the vertical sync pulse. Such a signal is hereafter referred to as a nonstandard signal. It should be noted that the nonstandard signal sometimes includes those standard signals which are low in S/N and video signals which are outputted from game machines.

Now, it is assumed that a general recursive noise reduction circuit be installed on a television receiver or the like in which not only the standard signal but also the nonstandard signal outputted from an analog VCR or the like mentioned above is inputted.

In this case, the noise component of each inputted standard signal is normally reduced by the installed general recursive noise reduction circuit.

However, because the horizontal sync pulses of the video signals of the even-numbered field and the odd-numbered field are in phase in the inputted nonstandard signal, the recursive noise reduction circuit cannot correctly determine whether the current field is the even-numbered field or the odd-numbered field. And, if a noise reducing operation including the interpolation processing by an interpolation filter 2 and an interpolation filter 5 is executed in this state, the effective reduction of noise cannot sometimes be achieved.

As one of examples of the above-mentioned inappropriate noise reducing operation, the noise to be reduced looks moving upward or downward on the display screen. When the noise to be reduced by executing a noise reducing operation moves, the noise becomes more conspicuous than the case in which no noise reducing operation is executed, leaving noise unmoved, thereby making the video image visually undesirable.

To solve the above-mentioned problem, a circuit for determining whether an inputted signal is the standard signal or the nonstandard signal may be added to a general recursive noise reduction apparatus to execute a noise reducing operation only when the inputted signal is the standard signal.

However, such a circuit having a simple circuit configuration and capable of determining with stability whether an inputted signal is the standard signal or the nonstandard signal has not been available.

DISCLOSURE OF INVENTION

It is therefore an object of the present invention to realize a circuit which has a simple circuit configuration and is capable of determining with stability whether an inputted signal is a standard signal or a nonstandard signal.

According to the present invention, there is provided a first video signal processing apparatus, including: field ID signal generating means for generating a field ID signal in correspondence with a phase difference between a horizontal sync signal of the video signal and a vertical sync signal of the video signal; first counting means for counting up, in correspondence with an edge of the vertical sync signal, a count value which cycles within a predetermined range; second counting means for counting up, in correspondence with each of both edges of the field ID signal, a count value which cycles within a predetermined range; acquiring means for acquiring the count value of the second counting means in correspondence with an edge of the vertical sync signal when the count value of the first counting means is a first value; and determining means for determining, on the basis of the count value of the second counting means acquired by the acquiring means, whether the video signal is a standard signal or a nonstandard signal.

In the above-mentioned first video signal processing apparatus, the determining means, if the count value of the second counting means acquired by the acquiring means is also the first value, determines that the video signal is the standard signal; if the count value of the second counting means acquired by the acquiring means is a second value, the determining means determines that the video signal is the nonstandard signal; and, if the count value of the second counting means acquired by the acquiring means is neither the first value nor the second value, the determining means holds a last determination result.

In the above-mentioned video signal processing apparatus, the standard signal is a video signal based on interlacing in which an even-numbered field and an odd-numbered field are arranged alternately.

According to the present invention, there is provided a first video signal processing method, including: a field ID signal generating step for generating a field ID signal in correspondence with a phase difference between a horizontal sync signal of the video signal and a vertical sync signal of the video signal; a first counting step for counting up, in correspondence with an edge of the vertical sync signal, a count value which cycles within a predetermined range; a second counting step for counting up, in correspondence with each of both edges of the field ID signal, a count value which cycles within a predetermined range; an acquiring step for acquiring the count value of the second counting step in correspondence with an edge of the vertical sync signal when the count value of the first counting step is a first value; and a determining step for determining, on the basis of the count value of the second counting step acquired by the acquiring step, whether the video signal is a standard signal or a nonstandard signal.

According to the present invention, there is provided a first recording medium including: a field ID signal generating step for generating a field ID signal in correspondence with a phase difference between a horizontal sync signal of the video signal and a vertical sync signal of the video signal; a first counting step for counting up, in correspondence with an edge of the vertical sync signal, a count value which cycles within a predetermined range; a second counting step for counting up, in correspondence with each both edges of the field ID signal, a count value which cycles within a predetermined range; an acquiring step for acquiring the count value of the second counting step in correspondence with an edge of the vertical sync signal when the count value of the first counting step is a first value; and a determining step for determining, on the basis of the count value of the second counting step acquired by the acquiring step, whether the video signal is a standard signal or a nonstandard signal.

According to the present invention, there is provided a first computer-readable program including: a field ID signal generating step for generating a field ID signal in correspondence with a phase difference between a horizontal sync signal of the video signal and a vertical sync signal of the video signal; a first counting step for counting up, in correspondence with an edge of the vertical sync signal, a count value which cycles within a predetermined range; a second counting step for counting up, in correspondence with each both edges of the field ID signal, a count value which cycles within a predetermined range; an acquiring step for acquiring the count value of the second counting step in correspondence with an edge of the vertical sync signal when the count value of the first counting step is a first value; and a determining step for determining, on the basis of the count value of the second counting step acquired by the acquiring step, whether the video signal is a standard signal or a nonstandard signal.

According to the present invention, there is provided a second video signal processing apparatus, including: field ID signal generating means for generating a field ID signal in correspondence with a phase difference between a horizontal sync signal of the video signal and a vertical sync signal of the video signal; first counting means for counting up, in correspondence with an edge of the vertical sync signal, a count value which cycles within a predetermined range; second counting means for counting up, in correspondence with each of both edges of the field ID signal, a count value which cycles within a predetermined range; acquiring means for acquiring the count value of the second counting means in correspondence with an edge of the vertical sync signal when the count value of the first counting means is a first value; determining means for determining, on the basis of the count value of the second counting means acquired by the acquiring means, whether the video signal is a standard signal or a nonstandard signal; and noise removing means for removing noise from the video signal by executing a different image processing operation on the video signal in accordance with a determination result obtained by the determining means.

In the above-mentioned second video signal processing apparatus, the video standard signal is a video signal based on interlacing in which an even-numbered field and an odd-numbered field are arranged alternately.

According to the present invention, there is provided a second video signal processing method, including: a field ID signal generating step for generating a field ID signal in correspondence with a phase difference between a horizontal sync signal of the video signal and a vertical sync signal of the video signal; a first counting step for counting up, in correspondence with an edge of the vertical sync signal, a count value which cycles within a predetermined range; a second counting step for counting up, in correspondence with each of both edges of the field ID signal, a count value which cycles within a predetermined range; an acquiring step for acquiring the count value of the second counting step in correspondence with an edge of the vertical sync signal when the count value of the first counting step is a first value; a determining step for determining, on the basis of the count value of the second counting step acquired by the acquiring step, whether the video signal is a standard signal or a nonstandard signal; and a noise removing step for removing noise from the video signal by executing a different image processing operation on the video signal in accordance with a determination result obtained by the determining step.

According to the present invention, there is provided a second recording medium including: a field ID signal generating step for generating a field ID signal in correspondence with a phase difference between a horizontal sync signal of the video signal and a vertical sync signal of the video signal; a first counting step for counting up, in correspondence with an edge of the vertical sync signal, a count value which cycles within a predetermined range; a second counting step for counting up, in correspondence with each of both edges of the field ID signal, a count value which cycles within a predetermined range; an acquiring step for acquiring the count value of the second counting step in correspondence with an edge of the vertical sync signal when the count value of the first counting step is a first value; a determining step for determining, on the basis of the count value of the second counting step acquired by the acquiring step, whether the video signal is a standard signal or a nonstandard signal; and a noise removing step for removing noise from the video signal by executing a different image processing operation on the video signal in accordance with a determination result obtained by the determining step.

According to the present invention, there is provided a second program having a computer execute: a field ID signal generating step for generating a field ID signal in correspondence with a phase difference between a horizontal sync signal of the video signal and a vertical sync signal of the video signal; a first counting step for counting up, in correspondence with an edge of the vertical sync signal, a count value which cycles within a predetermined range; a second counting step for counting up, in correspondence with each of both edges of the field ID signal, a count value which cycles within a predetermined range; an acquiring step for acquiring the count value of the second counting step in correspondence with an edge of the vertical sync signal when the count value of the first counting step is a first value; a determining step for determining, on the basis of the count value of the second counting step acquired by the acquiring step, whether the video signal is a standard signal or a nonstandard signal; and a noise removing step for removing noise from the video signal by executing a different image processing operation on the video signal in accordance with a determination result obtained by the determining step.

In the second video signal processing apparatus and method and program, a field ID signal is generated in correspondence with a phase difference between the horizontal sync signal of a video signal and the vertical sync signal thereof. In correspondence with the edge of the vertical sync signal, the first count value which cycles within a predetermined range is counted up. In correspondence with each of both edges of the field ID signal, the second count value which cycles within a predetermined range is counted up. Further, if the first count value is the first value, the second count value is obtained in correspondence with the edge of the vertical sync signal and, on the basis of the obtained second count value, a decision is made whether the input video signal is the standard signal or the nonstandard signal. Then, noise is removed from the input video signal by executing a different image processing operation on the input video signal in accordance with the decision result.

BRIEF DESCRIPTION OF DRAWINGS

FIG. 4 is a block diagram illustrating an exemplary configuration of a nonstandard signal detection circuit shown in FIG. 3.

FIG. 5 is a flowchart for describing nonstandard signal detection processing by a nonstandard signal detection circuit shown in FIG. 3.

FIG. 6 is a timing chart indicative of an operation of the nonstandard signal detection circuit shown in FIG. 3.

FIG. 7 is a timing chart indicative of another operation of the nonstandard signal detection circuit shown in FIG. 3.

BEST MODE FOR CARRYING OUT THE INVENTION

This invention will be described in further detail by way of example of a recursive noise reduction apparatus practiced as one embodiment with reference to the accompanying drawings.

A recursive noise reduction apparatus is used as installed on video signal processing apparatuses such as VCRs which record and reproduce video signals, video tuners which correspond to ground wave and satellite broadcasting, and television receivers for example, these video signal processing apparatuses being adapted to process video signals based on interlacing such as NTSC or PAL.

The above-mentioned recursive noise reduction apparatus operates in synchronization with a line lock clock locked with the horizontal sync signal included in each video signal and supposes that the standard signal or the nonstandard signal be inputted as an input video signal. The following describes the standard signal and the nonstandard signal.

The standard signal herein denotes a normal interlace video signal. To be more specific, the standard signal is a video signal based on interlacing in which odd-numbered fields and even-numbered fields exist alternately. Let 1 horizontal scan period be 1H, then the consecutive odd-numbered field and even-numbered field are shifted by 0.5H from each other in their horizontal sync pulse positions (or phases) with reference to the vertical sync pulse. consequently, a spatial positional relationship is obtained in which pixel horizontal lines alternate in odd-numbered field and even-numbered field. In each interlace video signal, the odd-numbered fields and the even-numbered fields are scanned in an interlacing manner to form 1 frame image.

The nonstandard signal herein denotes a video signal which is outputted from a VCR for example when it executes an irregular playback operation such as pause, fast-forward, rewind, or picture search. In this video signal, the horizontal sync pulse positions with respect to the vertical sync pulse are in phase in the odd-numbered field and the even-numbered field.

Figure 1:
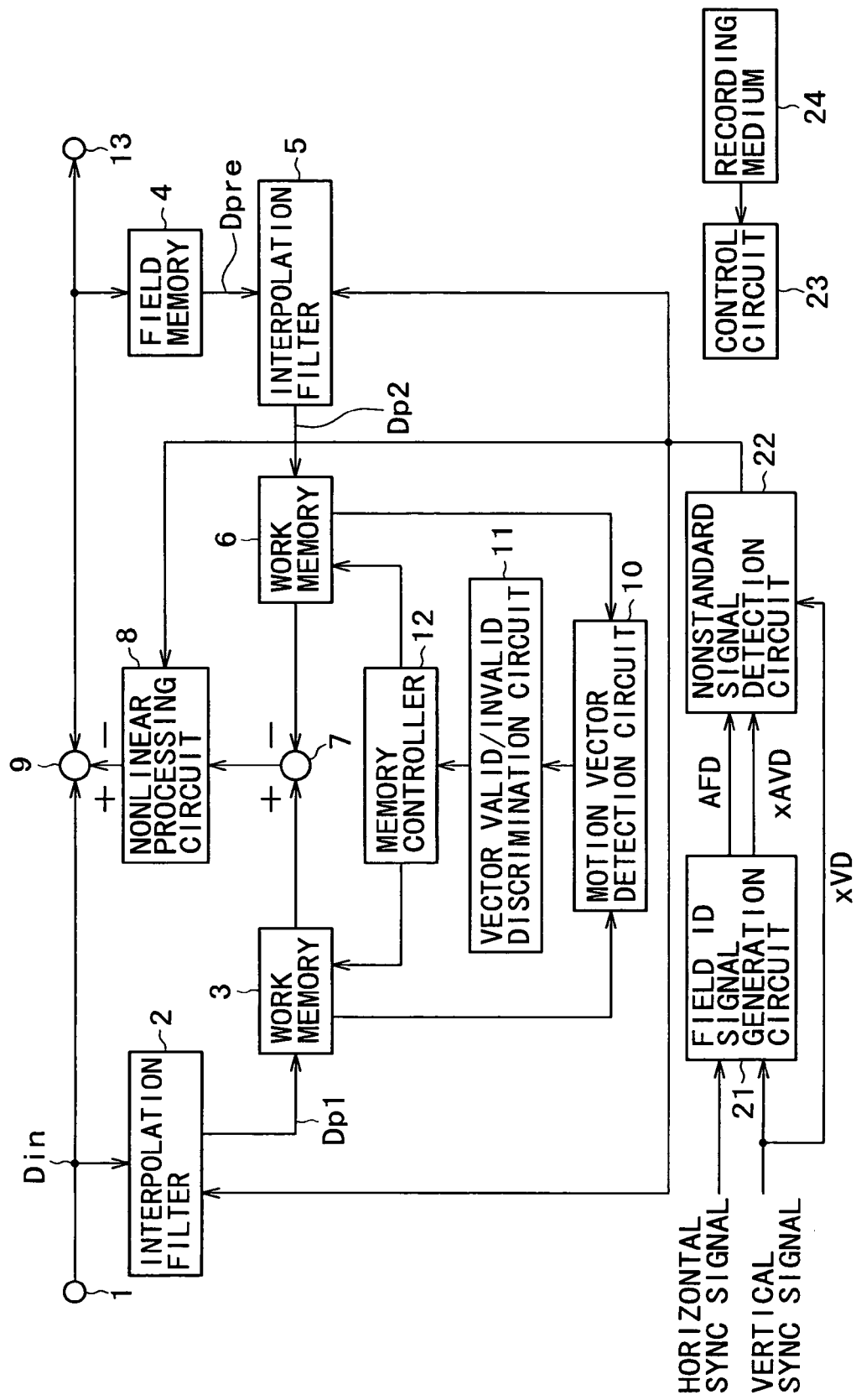
FIG. 1 is a block diagram illustrating an exemplary configuration of a recursive noise reduction apparatus practiced as one embodiment of the invention.

Referring to FIG. 1, there is shown an exemplary configuration of a recursive noise reduction apparatus practiced as one embodiment of the invention. In this recursive noise reduction apparatus, a digital video signal is inputted at an input terminal 1. It should be noted that this video signal is an interlace signal configured by the odd-numbered field image and the even-numbered field image typified by NTSC or PAL. An input video signal Din inputted at the input terminal 1 is supplied to an interpolation filter 2 and a subtractor 9.

The subtractor 9 subtracts a noise component signal inputted from a nonlinear processing circuit 8 to be described later from the input video signal Din and outputs a result to an output terminal 13 and a field memory 4. Consequently, a video signal reduced in noise is outputted from the output terminal 13.

The field memory 4 delays the noise-reduced video signal supplied from the subtractor 9 by 1 field period and outputs the delayed signal to an interpolation filter 5 as a pre-field video signal Dpre. On the other hand, the video signal Din of the current field is inputted in the interpolation filter 2.

The interpolation filter 2 and the interpolation filter 5 each interpolates the pixels in the vertical direction by setting a predetermined coefficient to the vertical pixels for each input video signal. It should be noted that the coefficient setting in each of the interpolation filter 2 and the interpolation filter 5 is alternated at every field period in accordance with the phase relationship between the current field image and the field image one field before the current field image.

Thus, when interpolation processing is executed in each of the interpolation processing by the interpolation filter 2 and the interpolation filter 5, the spatial phase relationship of the vertical pixels is aligned between interpolated video signals Dp1 and Dp1 outputted from the interpolation filter 2 and the interpolation filter 5 respectively. The interpolated video signal Dp1 of the current field timing from the interpolation filter 2 is written to a work memory 3. On the other hand, the interpolated video signal Dp2 delayed by 1 field relative to the current field is written from the interpolation filter 5 to a work memory 6.

Figure 2:
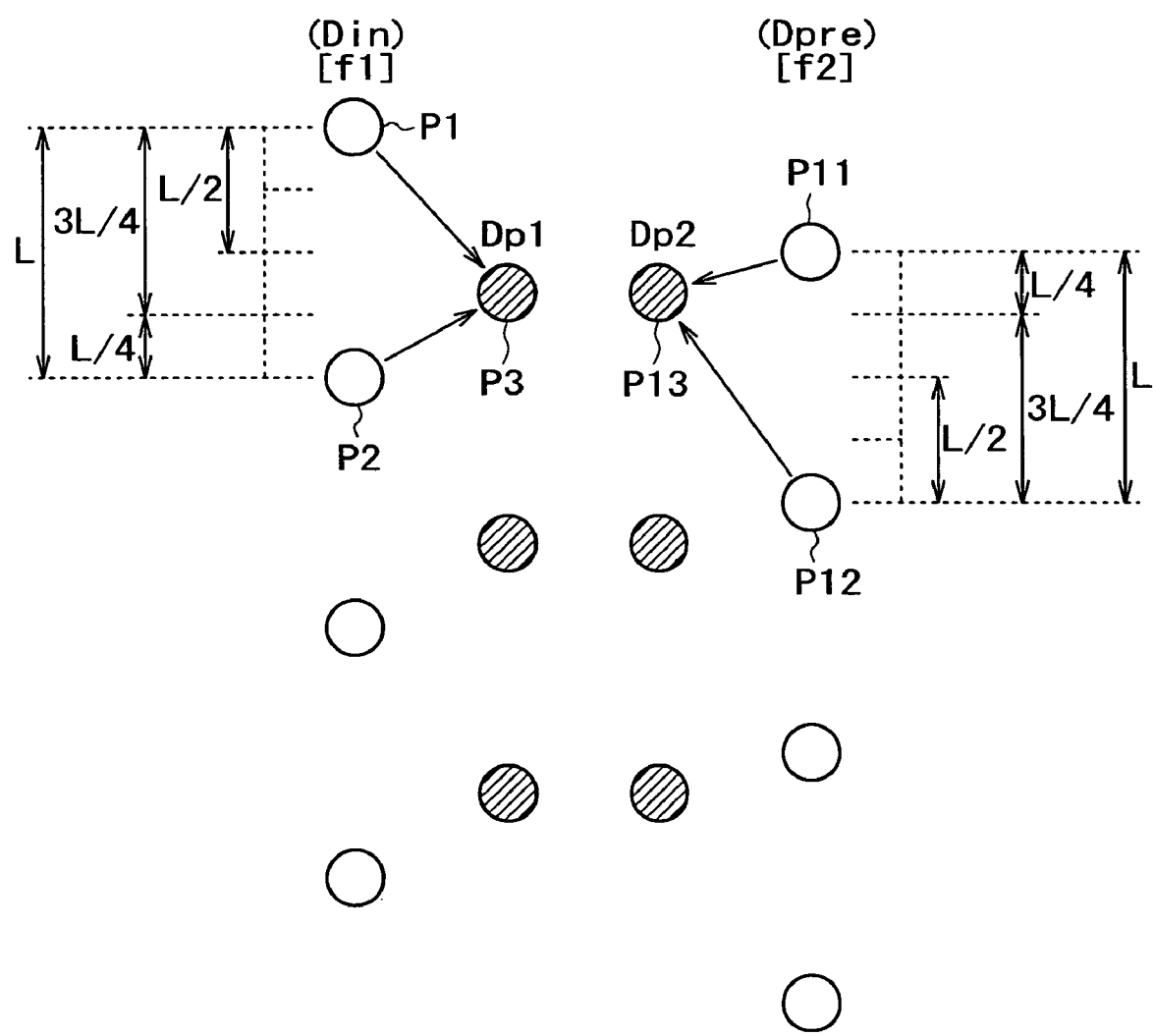
FIG. 2 is a diagram for describing interpolation processing by interpolation filters shown in FIG. 1.
Figure 3:
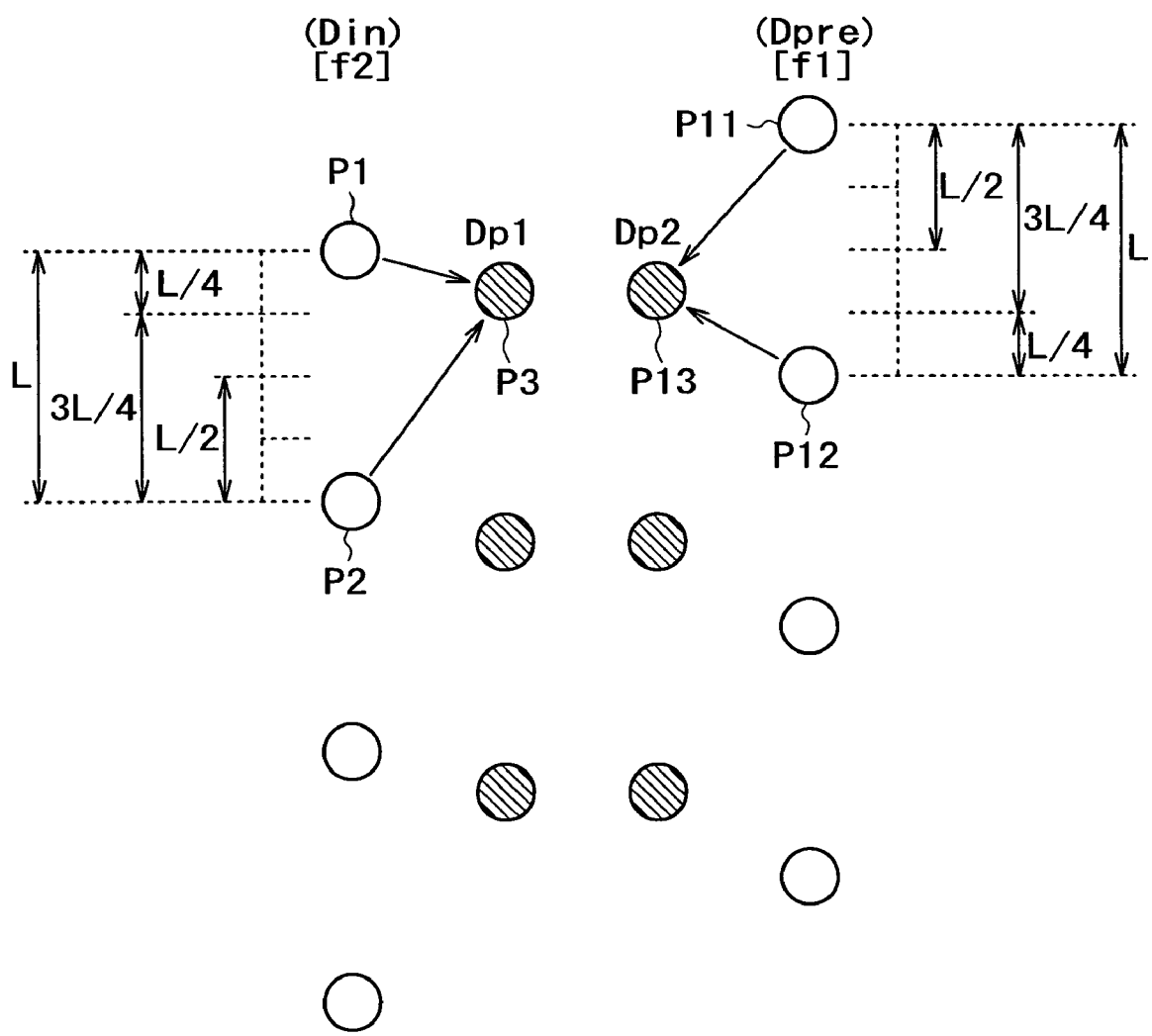
FIG. 3 is a diagram for describing interpolation processing by interpolation filters shown in FIG. 1.

The following describes the basic interpolation processing to be executed by the interpolation filter 2 and the interpolation filter 5 with reference to FIGS. 2 and 3.

Assume here that the input video signal Din to be inputted in the interpolation filter 2 be a video signal of odd-numbered field f1 as shown in FIG. 2. Assume also that the pre-field video signal Dpre to be inputted in the interpolation filter 5 be a video signal of odd-numbered field f2.

In this case, pixels P11 and P12 of the pre-field video signal Dpre which is the even-numbered field f2 are positioned so that they are spatially shifted in the up/down (vertical) direction alternately relative to pixels P1 and P2 of the input video signal Din which is the odd-numbered field f1.

To be more specific, let an interval between 2 adjacent vertical pixels (or a line interval) in each of the odd-numbered field f1 and the even-numbered field f2 be L, then each of the vertical pixels in one field is arranged at a position which is the intermediate position, L/2, between the 2 adjacent vertical pixels in the other field.

In the case shown in FIG. 2, pixels P11 and P12 of the even-numbered field are located L/2 respectively below pixels P1 and P2 which are vertically adjacent in the odd-numbered field f1. Pixel P2 is located at L/2 which is equidistant from pixels P11 and P12 which are vertically adjacent in the even-numbered field f2.

The interpolation filter 2 generates pixels of an interpolated video signal Dp1 by use of the pixel of the input video signal Din which is the odd-numbered field f1. The interpolation filter 5 generates pixels of an interpolated signal Dp2 by use of the pixel data of the pre-field video signal Dpre which is the even-numbered field f2.

To be more specific, pixel P3 of the interpolated video signal Dp1 is located at a distance of 3:1 relative to interval L between pixel P1 and pixel P2 of the input video signal Din (f1) before interpolation.

Namely, pixel P3 is located at a distance of 3L/4 from pixel P1 and L/4 from pixel P2. Therefore, the coefficient for the interpolation in the interpolation filter 2 in this case is accordingly 1:3. That is, the coefficients for the values of pixel P1 and pixel P2 are set ¼ and ¾ respectively and the value of pixel P3 is computed by obtaining a weighted average of the values of pixel P1 and pixel P2.

Pixel P13 of the interpolated video signal Dp2 is located at a distance of 1:3 relative to interval L between pixel P11 and pixel P12 of the pre-field video signal Dpre (f2) before interpolation. Namely, pixel P13 is located at a distance of L/4 from pixel P11 and 3L/4 from pixel P12.

Therefore, the coefficients for the interpolation by the interpolation filter 5 in this case are set to ¾ and ¼ corresponding to the values of pixel P11 and pixel P12 respectively so that a ratio of 3:1 is obtained, thereby computing the value of pixel P13 by executing weighted average on the values of pixels P11 and P12 with these coefficients.

This computation for interpolation aligns, in the vertical direction, the pixels of the interpolated video signal Dp1 obtained by interpolating the input video signal Din in the odd-numbered field f1 and the pixels of the interpolated video signal Dp2 obtained by interpolating the pre-field video signal Dpre in the even-numbered field f2.

Referring to FIG. 3, there is shown a case which is reverse to the case shown in FIG. 2. To be more specific, in this case, the input video signal Din to be inputted in the interpolation filter 2 is the video signal of the even-numbered field f2 and the pre-field video signal Dpre to be inputted in the interpolation filter 5 is the video signal of the odd-numbered field f1.

Also in the case shown in FIG. 3, for pixels P1 and P2 of the input video signal Din which is the even-numbered field f2, pixels P11 and P12 of the pre-field video signal Dpre which is the odd-numbered field f1 are arranged so that they are alternately shifted in the up/down (vertical) direction in spatial position. However, this vertical positional relationship is different from that shown in FIG. 2. Namely, pixels P11 and P12 of the odd-numbered field are located at a distance of L/2 from vertically adjacent pixels P1 and P2 of the even-numbered field f2. From the viewpoint of the odd-numbered field f1, pixel P1 is located at a distance of L/2 which is equidistant from pixel P11 and pixel P12 vertically adjacent in the odd-numbered field f1.

Namely, pixel P3 is located at a distance of L/4 from pixel P1 and 3L/4 from pixel P2. Therefore, the coefficient for the interpolation in the interpolation filter 2 in this case is accordingly 3:1. Namely, the coefficients corresponding to the values of pixels P1 and P2 are set to ¾ and ¼ respectively and the value of pixel P3 is computed by executing weighted average on the values of pixels P1 and P2.

Pixel P13 of the interpolated video signal Dp2 is located at distance of 3:1 relative to interval L between pixel P11 and pixel P12 of the pre-field video signal Dpre (f2) before interpolation. Namely, pixel P13 is located at a distance 3L/4 from pixel P11 and L/4 from pixel P12.

Therefore, for the coefficient for the interpolation in the interpolation filter 5 in this case, the coefficients corresponding to the values of pixels P11 and P12 are set to ¼ and ¾ respectively and the value of pixel P13 is computed by executing weighted average on the values of pixels P11 and P12 so that they are accordingly 1:3.

This computation for interpolation aligns, in the vertically direction as shown, the pixels of the interpolated video signal Dp1 obtained by interpolating the input video signal Din of the even-number field f2 and the pixels of the interpolated video signal Dp2 obtained by interpolating the pre-field video signal of the odd-numbered field f1.

Namely, in the case shown in FIG. 3, the interpolation filter 2 uses the coefficient set to the interpolation filter 5 as shown in FIG. 2 and the interpolation filter 5 uses the coefficient set to the interpolation filter 2 as shown in FIG. 2.

Thus, in the interpolation filter 2 and the interpolation filter 5, if the input video signal Din is the odd-numbered field 1 and the pre-field video signal Dpre is the even-numbered field 2, the coefficients described with reference to FIG. 2 are used. On the contrary, if the input video signal Din is the even-numbered field f2 and the pre-field video signal Dpre is the odd-numbered field f1, the coefficients described with reference to FIG. 3 are used.

Returning to the description with reference to FIG. 1, the work memories 3 and 6 is each configured by a delay circuit such as a delay line. The work memories 3 and 6 are each adapted to supply interpolated video signals Dp1 and Dp2 respectively to a motion vector detection circuit 10. The work memories 3 and 6 are adapted to supply, under the control of a memory controller 12, the interpolated video signals Dp1 and Dp2 to a subtractor 7 for motion compensation processing.

The motion vector detection circuit 10 detects a motion vector by applying a block matching algorithm to the interpolated video signals Dp1 and Dp2 having a temporal difference of 1 field inputted from the work memories 3 and 6 respectively. A vector valid/invalid discrimination circuit 11 determines the validity of the motion vector detected by the motion vector detection circuit 10. Namely, the vector valid/invalid discrimination circuit 11 determines whether to apply the motion vector detected by the motion vector detection circuit 10 to motion compensation.

The memory controller 12 controls the reading of the work memories 3 and 6 on the basis of the decision result of the vector valid/invalid discrimination circuit 11. Namely, if the motion vector is discriminated to be valid by the vector valid/invalid discrimination circuit 11, then the memory controller 12 outputs a motion compensation control signal to the work memories 3 and 6 so that motion compensation processing corresponding to the motion vector is executed on the interpolated video signals.

The video signals read from the work memories 3 and 6 under the control of the memory controller 12 are supplied to the subtractor 7. The subtractor 7 computes a difference signal obtained by subtracting the video signal supplied from the work memory 6 for the video signal supplied from the work memory 3 and outputs the obtained difference signal to the nonlinear processing circuit 8 as a weight-compensated signal.

The nonlinear processing circuit 8 executes attenuation processing on the difference signal supplied from the subtractor 7 by use of a predetermined characteristic curve. Namely, the nonlinear processing circuit 8 extracts a small-amplitude signal component from the difference signal supplied from the subtractor 7, thereby eventually extracting a noise component signal made up of a noise component. The extracted noise component signal is outputted to the subtractor 9.

The subtractor 9 subtracts a noise component signal from the input video signal Din as described above. Thus, the signal subtracted in the subtractor 9 is outputted from the output terminal 13 as a video signal which is reduced in noise. At the same time, this video signal is written to the field memory 4 for use of the noise reduction processing at a next field timing.

Using as the inputs the horizontal sync signal and the vertical sync signal xVD corresponding to the current video signal inputted in this recursive noise reduction apparatus, a field ID generation circuit 21 detects that the phase of the vertical sync signal of the standard signal (the video signal based on interlacing) is shifted by 0.5H from the horizontal sync signal in every vertical sync period to generate a field ID signal AFD which goes H (High) level and L (Low) level alternately for each field, outputting this generated signal to a nonstandard signal detection circuit 22.

Therefore, when the nonstandard signal is inputted, a field ID signal outputted from the field ID signal generation circuit 21 continuously goes H level or L level. At the same time, the field ID generation circuit 21 outputs an advance vertical sync signal xAVD which is delayed by 1H from a vertical sync signal xVD corresponding to the current video signal to the nonstandard signal detection circuit 22.

Using as the inputs the vertical sync signal xVD corresponding to the current video signal inputted in this recursive noise reduction apparatus, the advance vertical sync signal xAVD supplied from the field ID generation circuit 21, and the field ID signal AFD supplied from the field ID generation circuit 21, the nonstandard signal detection circuit 22 determines whether the video signal inputted in this recursive noise reduction apparatus is the standard signal or the nonstandard signal and outputs a nonstandard signal detection signal indicative of a decision result to the interpolation filter 2, the interpolation filter 5, and the nonlinear processing circuit 8.

It should be noted that the advance vertical sync signal xAVD and the vertical sync signal xVD go L level only in 1 clock in 1 vertical period as shown in A and B of FIG. 6. The field ID signal AFD changes its states in synchronization with the rising edge of the advance vertical sync signal xAVD as shown in D of FIG. 6.

If the nonstandard signal detection signal indicates that the video signal inputted in this recursive noise reduction apparatus is the standard signal, the interpolation filter 2, the interpolation filter 5, and the nonlinear processing circuit 8 in which the nonstandard signal detection signal is inputted operate as described above; however, if the nonstandard signal detection signal indicates that the video signal inputted in this recursive noise reduction apparatus is the nonstandard signal, one of three processing operations is executed, namely the processing in which the same coefficient is used for the interpolation by the interpolation filter 2 and the interpolation by the interpolation filter 5, the processing in which the interpolation by the interpolation filter 2 and the interpolation by the interpolation filter 5 are not executed, and the processing in which noise reduction is not substantially executed by setting the output (the noise component signal) of the nonlinear processing circuit 8 to 0.

A control circuit 23 reads a control program from a recording medium 24 and, under the control of this control program, controls each component circuit of this recursive noise reduction apparatus.

Referring to FIG. 4, there is shown an exemplary configuration of the nonstandard signal detection circuit 22. In the nonstandard signal detection circuit 22, an advance vertical sync signal xAVD is inputted in a free-running vertical sync edge counter 31, a field ID signal AFD is inputted in a free-running field ID edge counter 32, and a vertical sync signal xVD is inputted in a comparator 33.

The free-running vertical sync edge counter 31 increments by 1 the count value which cycles from 0 to 7 in synchronization with the edge of the advance vertical sync signal xAVD and outputs the count value to the free-running field ID edge counter 32 and the comparator 33.

The free-running field ID edge counter 32 increments the count value by 1 in synchronization with the rising edge and the falling edge of the field ID signal AFD. It should be noted that, in addition to the timing at which it starts operating, the free-running field ID edge counter 32 resets its count value (hereafter referred to as an FD edge count value) to 0 in synchronization with the rising edge of the field ID signal AFD when the count value of the free-running vertical sync edge counter 31 (hereafter referred to as a V count value) is 7.

The comparator 33 generates a nonstandard signal detection signal (which goes H level when it is the nonstandard signal and L level when it is the standard signal) in correspondence with the FD edge count value with the V count value being 7 and the vertical sync signal xVD being at L level and outputs the generated nonstandard signal detection signal to the following stage.

The following describes nonstandard signal detection processing to be executed by the nonstandard signal detection circuit 22 with reference to the flowchart shown in FIG. 5. This nonstandard signal detection processing starts when an video signal is inputted in this recursive noise reduction apparatus.

In step S1, the free-running vertical sync edge counter 31 and the free-running field ID edge counter 32 start counting in synchronization with predetermined signals after resetting their count values to 0.

In step S2, the comparator 33 determines whether or not the V count value is 7 and the vertical sync signal xVD is at L level and waits until the V count value is 7 and the vertical sync signal xVD is at L level. If the V count value is found to be 7 and the vertical sync signal xVD is found at L level, the procedure goes to step S3.

In step S3, the comparator 33 determines whether or not the FD edge count value is 7. If the FD edge count value is found to be 7, the procedure goes to step S4. In step S4, the comparator 33 outputs the nonstandard signal detection signal of L level to the following stage so that the currently input video signal is the standard signal. Then, the procedure returns to step S2 to repeat the above-mentioned processing therefrom.

If the FD edge count value is found not to be 7 in step S3, then the procedure goes to step S5. In step S5, the comparator 33 determines whether or not the FD edge count value is 0. If the FD edge count value is found to be 0, then the procedure goes to step S6. In step S6, the comparator 33 outputs the nonstandard signal detection signal of H level to the following stage so that the currently input video signal is the nonstandard signal. Then, the procedure returns to step S2 to repeat the above-mentioned processing therefrom.

If the FD edge count value is found not to be 0 in step S5, namely, the FD edge count value is one of 1 through 6, then the procedure goes to step S7. In step S7, the comparator 33 maintains the level of the currently outputted nonstandard signal detection signal.

Thus, if the FD edge count value is one of 1 through 6, it indicates that a soft decision in which the previous decision result is maintained is used, so that the decision between standard and nonstandard does not change frequently, namely, stable decision is executed. Then, the procedure returns to step S2 to repeat the above-mentioned processing therefrom.

Then, the nonstandard signal detection processing continues until the inputting of video signals into this recursive noise reduction apparatus comes to an end.

It should be noted that the value of the decision criterion (the V count value=7) in step S2 and the value of the decision criterion (the V count value=0) in step S5 may be other values. Also, the range of V count values may not be 0 through 7.

The nonstandard signal detection processing by the nonstandard signal detection circuit 22 is executed as described above.

Referring to FIGS. 6 and 7, there are shown timing charts indicative of operations of the nonstandard signal detection circuit 22. In each of FIGS. 6 and 7, A denotes a vertical sync signal xVD, B denotes an advance vertical sync signal xAVD, C denotes a V count value, D denotes an advance field ID signal AFD, E denotes both edges of an advance field ID signal AFD, F denotes an FD edge count value, and G denotes a nonstandard signal detection signal.

FIG. 6 shows an example in which, after the video signal has been determined changed from standard to nonstandard, the decision of the nonstandard signal is maintained by a soft decision.

FIG. 7 shows an example in which, after the video signal has been determined changed from standard to nonstandard, the video signal has returned to the standard signal.

Meanwhile, the above-mentioned sequence of processing operations may be executed not only by hardware but also by software. In the software approach, the programs constituting the software are installed from a program storage medium, the recording medium 24 shown in FIG. 1 for example, into a computer incorporated in a dedicated hardware apparatus or a general-purpose personal computer for example which is able to execute various functions by installing various programs.

The recording medium 24 may be constituted not only by a package medium made up of a magnetic disk (including flexible disks), an optical disk (including CD-ROM (Compact Disc-Read Only Memory) and DVD (Digital Versatile Disc), a magneto-optical disk (including MD (Mini-Disc)), or a semiconductor memory, but also by a ROM or a hard disk in which the programs are stored and which are provided to users as incorporated in computers.

It should be noted herein that the steps for describing each program recorded in recording media include not only the processing operations which are sequentially executed in a time-series manner but also the processing operations which are executed concurrently or discretely.

INDUSTRIAL APPLICABILITY

As described and according to the invention, a circuit may be realized which has a simple circuit configuration and is capable of determining with stability whether an input video signal is the standard signal or the nonstandard signal.

The invention claimed is:

1. A video signal processing apparatus for determining whether or not an input video signal is a standard signal, comprising:
   field ID signal generating means for generating a field ID signal in correspondence with a phase difference between a horizontal sync signal of said video signal and a vertical sync signal of said video signal;
   first counting means for counting up, in correspondence with an edge of said vertical sync signal, a count value which cycles within a predetermined range;
   second counting means for counting up, in correspondence with each of both edges of said field ID signal, a count value which cycles within a predetermined range;
   acquiring means for acquiring the count value of said second counting means in correspondence with an edge of said vertical sync signal when the count value of said first counting means is a first value; and
   determining means for determining, on the basis of the count value of said second counting means acquired by said acquiring means, whether said video signal is a standard signal or a nonstandard signal.

2. The video signal processing apparatus according to claim 1, wherein said determining means, if the count value of said second counting means acquired by said acquiring means is also said first value, determines that said video signal is said standard signal; if the count value of said second counting means acquired by said acquiring means is a second value, said determining means determines that said video signal is said nonstandard signal; and, if the count value of said second counting means acquired by said acquiring means is neither said first value nor said second value, said determining means holds a last determination result.

3. The video signal processing apparatus according to claim 1, wherein said standard signal is a video signal based on interlacing in which an even-numbered field and an odd-numbered field are arranged alternately.

4. A video signal processing method for determining whether or not an input video signal is a standard signal, comprising:
   a field ID signal generating step for generating a field ID signal in correspondence with a phase difference between a horizontal sync signal of said video signal and a vertical sync signal of said video signal;
   a first counting step for counting up, in correspondence with an edge of said vertical sync signal, a count value which cycles within a predetermined range;
   a second counting step for counting up, in correspondence with each of both edges of said field ID signal, a count value which cycles within a predetermined range;
   an acquiring step for acquiring the count value of said second counting step in correspondence with an edge of said vertical sync signal when the count value of said first counting step is a first value; and
   a determining step for determining, on the basis of the count value of said second counting step acquired by said acquiring step, whether said video signal is a standard signal or a nonstandard signal.

5. A recording medium recording a computer-readable program for determining whether or not an input video signal is a standard signal, said computer-readable program comprising:
- a field ID signal generating step for generating a field ID signal in correspondence with a phase difference between a horizontal sync signal of said video signal and a vertical sync signal of said video signal;
- a first counting step for counting up, in correspondence with an edge of said vertical sync signal, a count value which cycles within a predetermined range;
- a second counting step for counting up, in correspondence with each both edges of said field ID signal, a count value which cycles within a predetermined range;
- an acquiring step for acquiring the count value of said second counting step in correspondence with an edge of said vertical sync signal when the count value of said first counting step is a first value; and
- a determining step for determining, on the basis of the count value of said second counting step acquired by said acquiring step, whether said video signal is a standard signal or a nonstandard signal.

6. A computer-readable program for determining whether or not an input video signal is a standard signal, said computer-readable program having a computer execute:
- a field ID signal generating step for generating a field ID signal in correspondence with a phase difference between a horizontal sync signal of said video signal and a vertical sync signal of said video signal;
- a first counting step for counting up, in correspondence with an edge of said vertical sync signal, a count value which cycles within a predetermined range;
- a second counting step for counting up, in correspondence with each both edges of said field ID signal, a count value which cycles within a predetermined range;
- an acquiring step for acquiring the count value of said second counting step in correspondence with an edge of said vertical sync signal when the count value of said first counting step is a first value; and
- a determining step for determining, on the basis of the count value of said second counting step acquired by said acquiring step, whether said video signal is a standard signal or a nonstandard signal.

7. A video signal processing apparatus for determining whether or not an inputted signal is a standard signal, comprising:
- field ID signal generating means for generating a field ID signal in correspondence with a phase difference between a horizontal sync signal of said video signal and a vertical sync signal of said video signal;
- first counting means for counting up, in correspondence with an edge of said vertical sync signal, a count value which cycles within a predetermined range;
- second counting means for counting up, in correspondence with each of both edges of said field ID signal, a count value which cycles within a predetermined range;
- acquiring means for acquiring the count value of said second counting means in correspondence with an edge of said vertical sync signal when the count value of said first counting means is a first value;
- determining means for determining, on the basis of the count value of said second counting means acquired by said acquiring means, whether said video signal is a standard signal or a nonstandard signal; and
- noise removing means for removing noise from said video signal by executing a different image processing operation on said video signal in accordance with a determination result obtained by said determining means.

8. The video signal processing apparatus according to claim 7, wherein said video standard signal is a video signal based on interlacing in which an even-numbered field and an odd-numbered field are arranged alternately.

9. A video signal processing method for determining whether or not an inputted signal is a standard signal, comprising:
- a field ID signal generating step for generating a field ID signal in correspondence with a phase difference between a horizontal sync signal of said video signal and a vertical sync signal of said video signal;
- a first counting step for counting up, in correspondence with an edge of said vertical sync signal, a count value which cycles within a predetermined range;
- a second counting step for counting up, in correspondence with each of both edges of said field ID signal, a count value which cycles within a predetermined range;
- an acquiring step for acquiring the count value of said second counting step in correspondence with an edge of said vertical sync signal when the count value of said first counting step is a first value;
- a determining step for determining, on the basis of the count value of said second counting step acquired by said acquiring step, whether said video signal is a standard signal or a nonstandard signal; and
- a noise removing step for removing noise from said video signal by executing a different image processing operation on said video signal in accordance with a determination result obtained by said determining step.

10. A recording medium recording a computer-readable program for determining whether or not an input video signal is a standard signal, said computer-readable program comprising:
- a field ID signal generating step for generating a field ID signal in correspondence with a phase difference between a horizontal sync signal of said video signal and a vertical sync signal of said video signal;
- a first counting step for counting up, in correspondence with an edge of said vertical sync signal, a count value which cycles within a predetermined range;
- a second counting step for counting up, in correspondence with each of both edges of said field ID signal, a count value which cycles within a predetermined range;
- an acquiring step for acquiring the count value of said second counting step in correspondence with an edge of said vertical sync signal when the count value of said first counting step is a first value;
- a determining step for determining, on the basis of the count value of said second counting step acquired by said acquiring step, whether said video signal is a standard signal or a nonstandard signal; and
- a noise removing step for removing noise from said video signal by executing a different image processing operation on said video signal in accordance with a determination result obtained by said determining step.

11. A computer-readable program for determining whether or not an input video signal is a standard signal, said computer-readable program having a computer execute:
- a field ID signal generating step for generating a field ID signal in correspondence with a phase difference between a horizontal sync signal of said video signal and a vertical sync signal of said video signal;
- a first counting step for counting up, in correspondence with an edge of said vertical sync signal, a count value which cycles within a predetermined range;

a second counting step for counting up, in correspondence with each of both edges of said field ID signal, a count value which cycles within a predetermined range;

an acquiring step for acquiring the count value of said second counting step in correspondence with an edge of said vertical sync signal when the count value of said first counting step is a first value;

a determining step for determining, on the basis of the count value of said second counting step acquired by said acquiring step, whether said video signal is a standard signal or a nonstandard signal; and a noise removing step for removing noise from said video signal by executing a different image processing operation on said video signal in accordance with a determination result obtained by said determining step.

* * * * *